United States Patent
Hasegawa et al.

(10) Patent No.: US 7,328,596 B2
(45) Date of Patent: Feb. 12, 2008

(54) STEERING LOCK

(75) Inventors: Hiroyasu Hasegawa, Aichi (JP); Masanari Okuno, Aichi (JP); Takeshi Murakami, Aichi (JP); Mitsuo Murakami, Toyota (JP)

(73) Assignee: Kabushiki Kaisha Tokai Rika Denki Seisakusha, Aichi (JP)

( * ) Notice: Subject to any disclaimer, the term of this patent is extended or adjusted under 35 U.S.C. 154(b) by 0 days.

(21) Appl. No.: 11/188,944

(22) Filed: Jul. 25, 2005

(65) Prior Publication Data
US 2006/0021398 A1   Feb. 2, 2006

(30) Foreign Application Priority Data
Jul. 29, 2004 (JP) .............................. 2004-221400
Jul. 29, 2004 (JP) .............................. 2004-221401

(51) Int. Cl.
*B60R 25/02* (2006.01)
*E05B 63/00* (2006.01)
(52) U.S. Cl. ........................... 70/186; 70/156; 70/252
(58) Field of Classification Search ................ 701/186, 701/156, 252
See application file for complete search history.

(56) References Cited

U.S. PATENT DOCUMENTS

| | | | | |
|---|---|---|---|---|
| 4,425,770 A | * | 1/1984 | Mentani et al. | ............... 70/252 |
| 5,794,469 A | * | 8/1998 | Suzuki | ......................... 70/252 |
| 6,354,118 B1 | * | 3/2002 | Frick et al. | .................... 70/186 |
| 2002/0088257 A1 | * | 7/2002 | Dimig et al. | ................. 70/186 |
| 2002/0108412 A1 | | 8/2002 | Starken | ....................... 70/275 |
| 2002/0117841 A1 | | 8/2002 | Landmann | ................. 280/775 |
| 2004/0069027 A1 | | 4/2004 | Fukushima | .................. 70/186 |
| 2004/0075232 A1 | | 4/2004 | Zillmann | ..................... 280/89 |
| 2005/0183476 A1 | * | 8/2005 | Feucht et al. | ................. 70/186 |

FOREIGN PATENT DOCUMENTS

| | | |
|---|---|---|
| EP | 1232921 | 8/2002 |
| JP | 59-192648 | 11/1984 |
| JP | 07-009944 | 1/1995 |
| JP | 10-138872 | 5/1998 |
| JP | 2002-234419 | 8/2002 |
| JP | 2002-283964 | 10/2002 |
| JP | 2003-063354 | 3/2003 |

* cited by examiner

*Primary Examiner*—Patricia Engle
*Assistant Examiner*—Kristina R Gluchowski
(74) *Attorney, Agent, or Firm*—Marsh Fischmann & Breyfogle LLP

(57) ABSTRACT

A steering lock that is easy to assemble but difficult for an automobile thief to dismantle. The steering lock includes a cover on which a support structure for supporting a lock mechanism is integrally formed. The lock mechanism is attached to the cover to assemble a first subunit. A steering lock ECU is attached to an ECU case to assemble a second subunit. The first subunit is attached to the second subunit to assemble a lock unit. The lock unit is attached to the housing. A bolt fastens the lock unit and the housing to each other. A second connector is then attached to the housing.

17 Claims, 12 Drawing Sheets

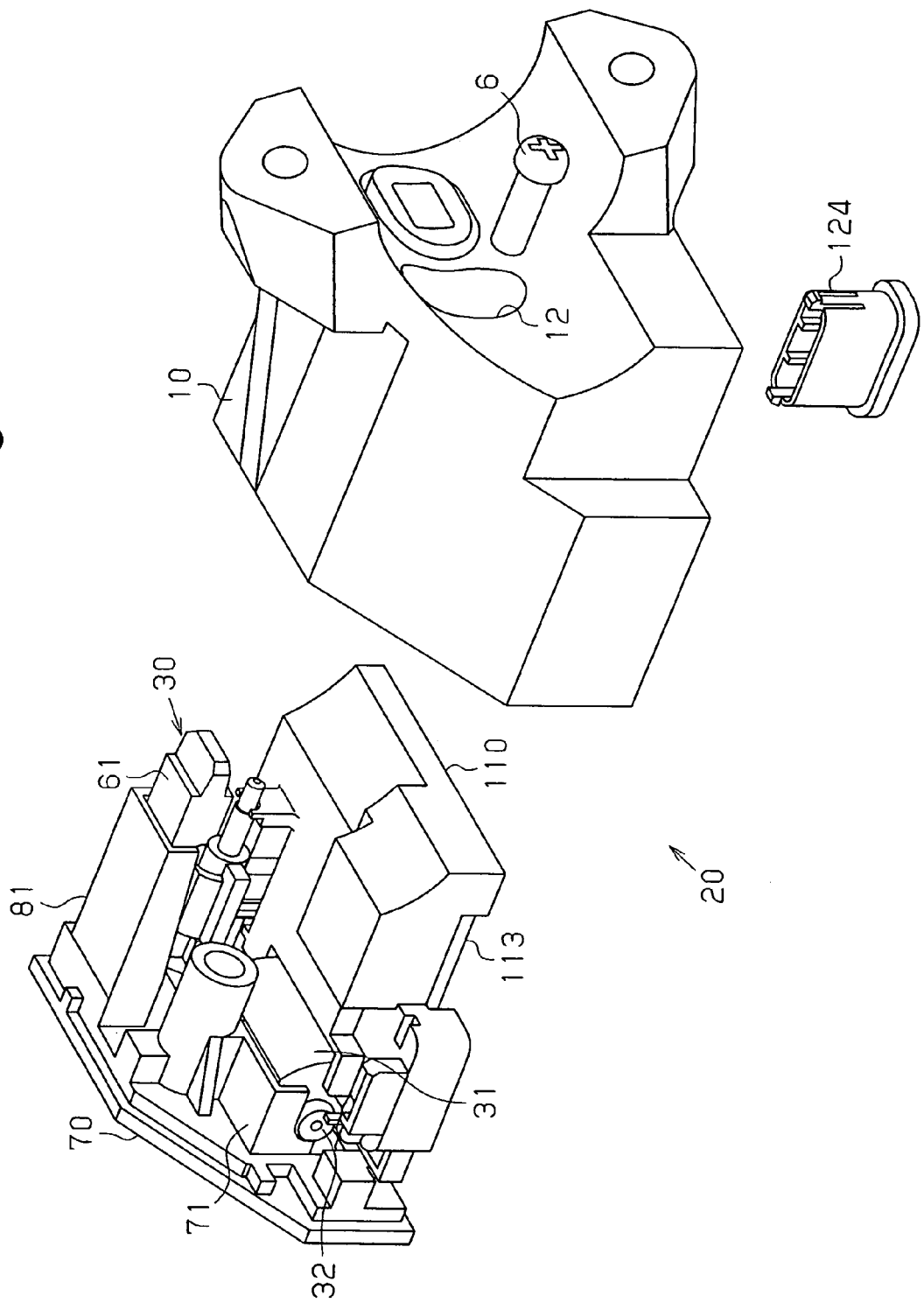

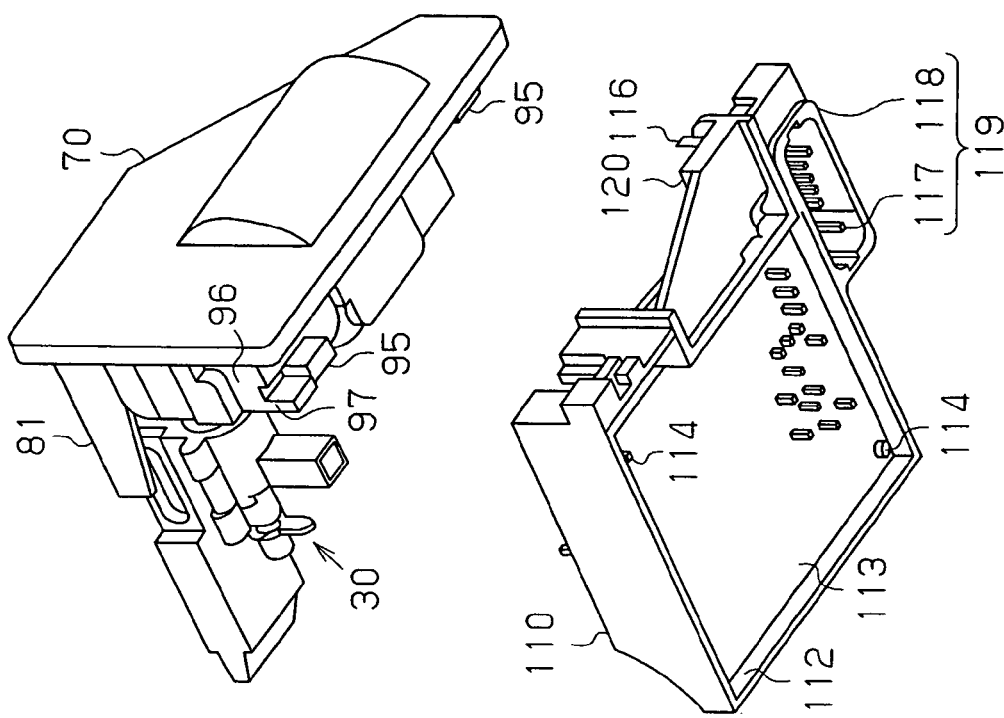
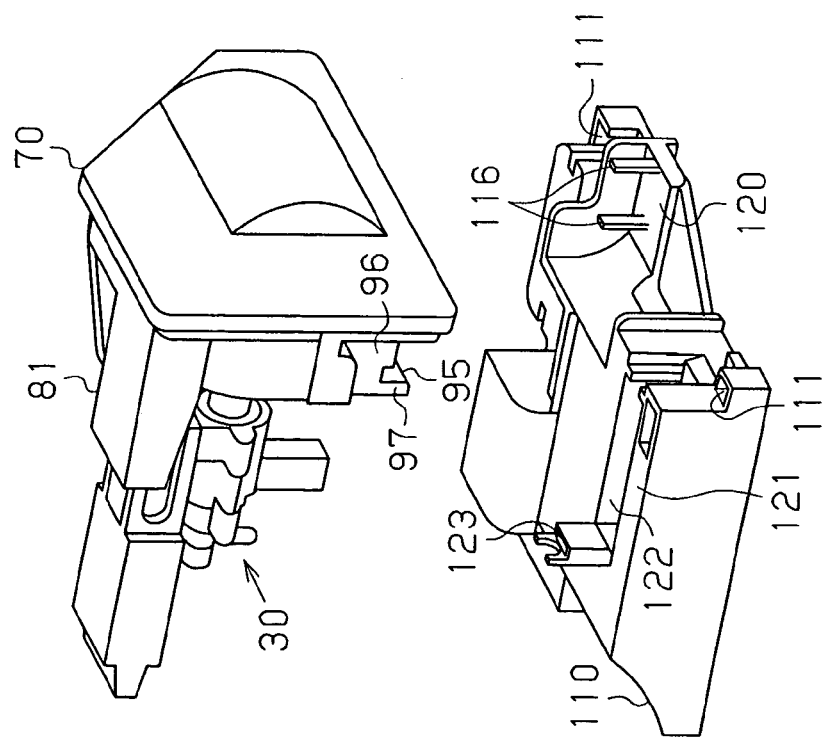

STEERING LOCK

CROSS-REFERENCE TO RELATED APPLICATIONS

This application is based upon and claims the benefit of priority from prior Japanese Patent Application Nos. 2004-221400 and 2004-221401, filed on Jul. 29, 2004, the entire contents of which are incorporated herein by reference.

BACKGROUND OF THE INVENTION

The present invention relates to a steering lock for use in vehicles.

A conventional manual steering lock is described in Japanese Patent No. 3183588. In this conventional manual steering lock, a mechanical key, which is inserted in a key cylinder, is turned to engage a lock bar with a steering shaft.

Conventional electric steering locks are described in Japanese Laid-Open Patent Publication Nos. 2002-234419, 2003-063354, 10-138872, and 2002-283964. These conventional electric steering locks include an actuator such as a motor that is powered when a mechanical key, which is inserted in a key cylinder, is turned. A steering shaft is locked by a lock bar driven by the actuator.

FIG. 1 shows a conventional electric steering lock 101. A steering wheel 106 is mounted on a steering shaft 2. The electric steering lock 101 includes a sleeve 3 covering the steering shaft 2, bearings 103 and 104 which rotatably support the steering shaft 2 relative to the sleeve 3, and a housing 10a. The sleeve 3 is supported by part of a vehicle (not shown). The steering shaft 2 includes a gear-shaped rotation restrictor 109. An insertion hole 108 extends through the sleeve 3 at a position corresponding to the rotation restrictor 109.

As shown in FIG. 2, the housing 10a has an arcuate mounting surface 11a, which extends along the surface of the sleeve 3. A lock bar passage 11b opens in the mounting surface 11a. The lock bar passage 11b is connected with the insertion hole 108 of the sleeve 3. The sleeve 3 is held between the housing 10a and a bracket 4. Bolts 5 fasten the housing 10a and the bracket 4 to fix the housing 10a to the sleeve 3.

As shown in FIGS. 1 and 2, a lock bar 61 is housed in the housing 10a. The lock bar 61 has a distal end that extends through the lock bar passage 11b of the housing 10a and the insertion hole 108 and into the sleeve 3. The lock bar 61 moves between a lock position, the state of which is shown by the solid lines in FIG. 2, and an unlock position, the state of which is shown by the broken lines. When in the lock position, the distal end of the lock bar 61 engages with the rotation restrictor 109 and prohibits rotation of the rotation restrictor 109, or rotation of the steering wheel 106. When in the unlock position, the distal end of the lock bar 61 is separated from the rotation restrictor 109 to permit rotation of the rotation restrictor 109, or rotation of the steering wheel 106.

As shown in FIGS. 2 and 3, a lock mechanism, which includes a motor 31 and a transmission mechanism 41a, drives the lock bar 61 and is housed in the housing 10a. The motor 31 is controlled by a steering lock ECU (not shown) housed in the housing 10a. The transmission mechanism 41a transmits the drive force of the motor 31 to the lock bar 61.

The motor 31 is fixed to the inner surface of the housing 10a by a motor bracket 31b. The transmission mechanism 41a includes a worm gear 42a, a helical gear 43a, a rotary shaft 44a, a lock bar support 54a, and a spring 47. The worm gear 42a is fixed to the output shaft of the motor 31. The helical gear 43a meshes with the worm gear 42a. The rotary shaft 44a is fixed to the helical gear 43a. The rotary shaft 44a has a male thread 51a. The male thread 51a engages a female thread 53a extending through the lock bar support 54a, which is L-shaped (see FIG. 3). The lock bar support 54a has a distal end elastically connected to the lock bar 61 by the spring 47. The motor 31 drives and moves the lock bar support 54a along the rotary shaft 44a. The lock bar 61 moves with the lock bar support 54a.

As shown in FIG. 2, the housing 10a has an opening 15a located opposite to the mounting surface 11a. The transmission mechanism 41a and the motor 31 are arranged in the housing 10a through the opening 15a. A cover 70a closes the opening 15a. A plurality of bolts 128 are fastened to the housing 10a from the outer side of the cover 70a so that the cover 70a is fixed to the end face of the housing 10a. The cover 70a and the heads of the bolts 128 are covered by a protective cover 129, which is fitted to the housing 10a. The protective cover 129 prevents vehicle theft since it makes the cover 70a difficult to remove, and thus the steering lock 101 difficult to dismantle. Accordingly, the protective cover 129 is indispensable for maintaining the theftproof effect of the conventional electric steering lock 101.

However, the protective cover 129 increases the number of components required for the electric steering lock 101. Additionally, the fitting of the protective cover 129 to the housing 10a also decreases the assembly efficiency for the electric steering lock 101.

SUMMARY OF THE INVENTION

It is an object of the present invention to provide a steering lock that is difficult to dismantle, has fewer components, and is easy to assemble.

One aspect of the present invention is a steering lock for attachment to a sleeve covering a steering shaft in a vehicle for selectively disabling steering. The steering lock is provided with a housing including a mounting surface attachable to the sleeve and an opening formed opposite to the mounting surface. A lock mechanism is housed in the housing. The lock mechanism includes a lock member for engaging with and disengaging from the steering shaft. A cover, fixed to the housing, closes the opening. A first fastener is inserted into the housing from the mounting surface to fix the cover to the housing. A second fastener is formed on the cover, housed in the housing, and engaged with the first fastener. The cover is fixed to the housing by the engagement between the first fastener and the second fastener.

A further aspect of the present invention is a steering lock for selectively disabling steering by engaging a lock bar with a vehicle steering shaft. The steering lock includes a housing defining an accommodation chamber having an opening. Internal components are inserted in the accommodation chamber through the opening. A cover closes the opening. A holder holds the internal components, with at least part of the holder being integrally formed with the cover.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 7 is an exploded perspective view showing a lock unit and a housing of the steering lock shown in FIG. 6;

FIGS. 10A and 10B are exploded perspective both showing an ECU case and a cover;

DETAILED DESCRIPTION OF THE PREFERRED EMBODIMENTS

An electric steering lock 1 for use in vehicles according to a first embodiment of the present invention will now be described with reference to FIGS. 4 and 5.

Figure 1:
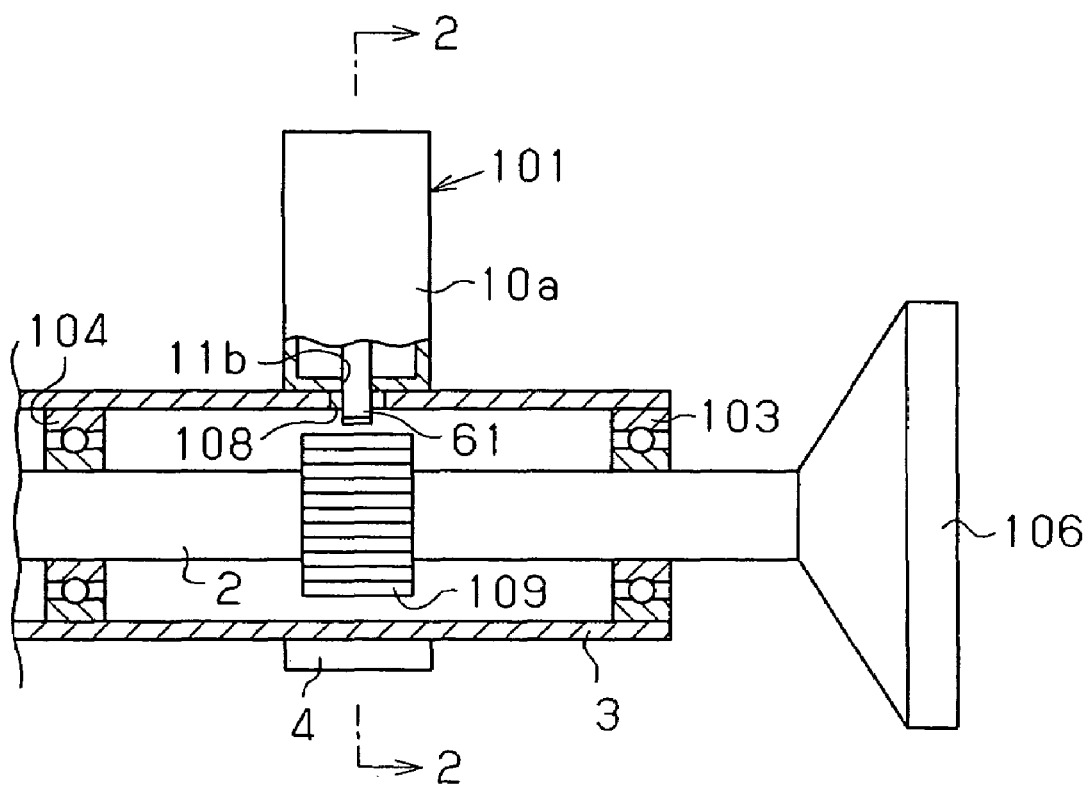
FIG. 1 is a cross-sectional view of a conventional steering lock.

The electric steering lock 1 will now be discussed in so as to describe the differences from the conventional steering lock 101 shown in FIGS. 1 to 3. Like or same reference numerals are given to those components that are the same as the corresponding components of the steering lock shown in FIGS. 1 to 3. The steering lock 1 of the first embodiment differs from the conventional steering lock 101 in the structure for fastening the cover to the housing.

Figure 4:
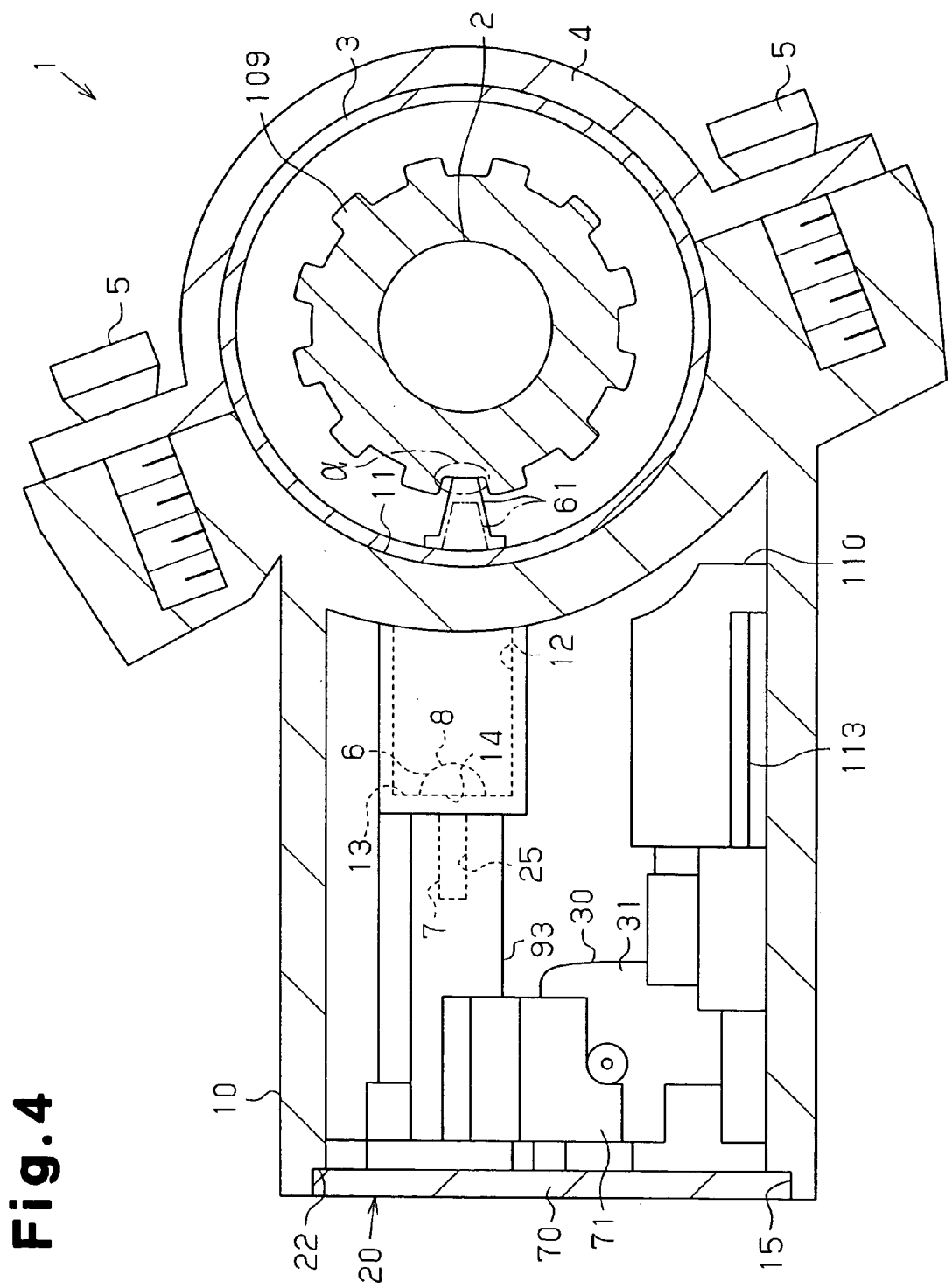
FIG. 4 is a partial cross-sectional view showing a steering lock according to a first embodiment of the present invention.

As shown in FIG. 4, the electric steering lock 1 includes a housing 10 and a bracket 4. A sleeve 3 is fixed to the housing 10 by fastening the housing 10 and the bracket 4 to each other. The housing 10 has an arcuate mounting surface 11 extending along the outer surface of the sleeve 3. The mounting surface 11 has a radius of curvature that is the same as that of the outer surface of the sleeve 3. Therefore, when the housing 10 is fixed to the sleeve 3, the mounting surface 11 is in close contact with the outer surface of the sleeve 3.

Figure 5:
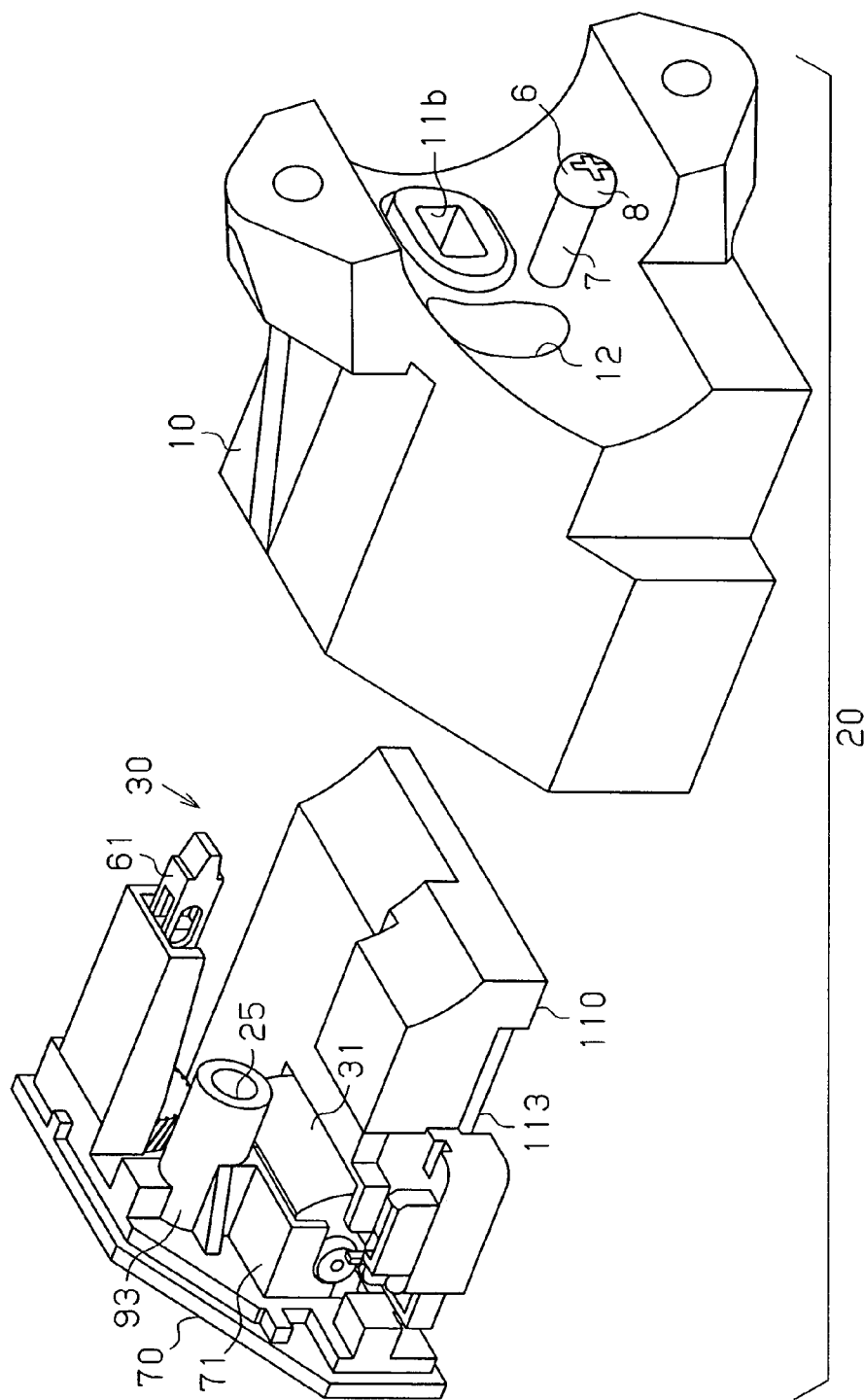
FIG. 5 is an exploded perspective view showing a main body of the steering lock in FIG. 4.
Figure 6:
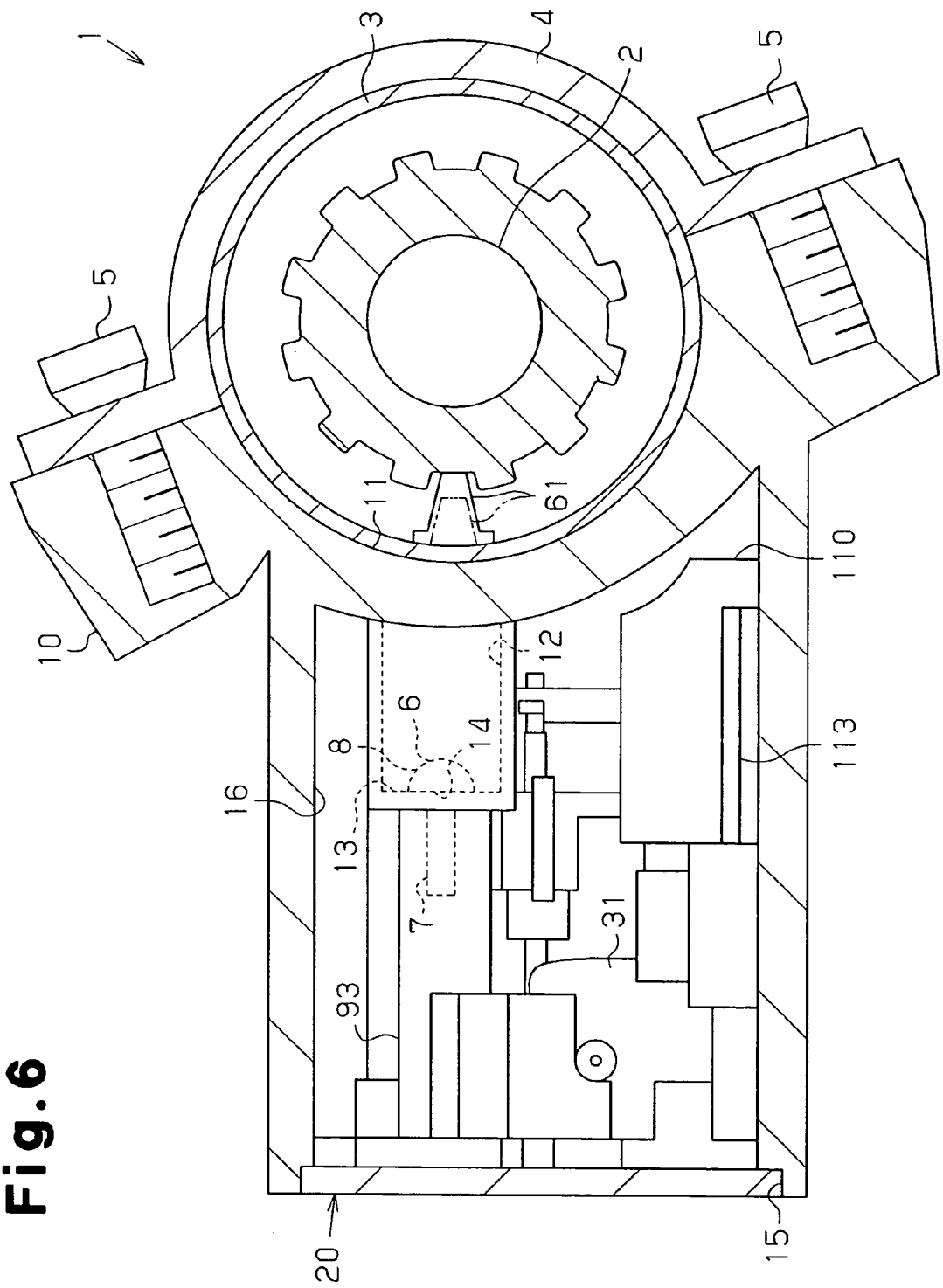
FIG. 6 is a cross-sectional view showing a steering lock according to a second embodiment of the present invention.

As shown in FIGS. 4 and 5, the housing 10 has a receptacle 12, which opens in the mounting surface 11. A bolt hole 14 is formed in the bottom 13 of the receptacle 12. A bolt 6, which functions as a first fastener, is received in the bolt hole 14. The bolt 6 includes a male-thread shaft 7, which functions as a fastening portion, and a head 8, which is formed integrally with the shaft 7. The head 8 has a diameter greater than the inner diameter of the bolt hole 14. The head 8 of the bolt 6 abuts against the bottom 13 of the receptacle 12. The depth of the receptacle 12 is such that the head 8 is not exposed from the mounting surface 11. Accordingly, the head 8 is received in the receptacle 12.

The housing 10 has an opening 15 located opposite to the mounting surface 11 (on the left side as viewed in FIG. 4). A step 22 is formed in each side wall near the opening 15. A cover 70 is arranged in the opening 15 and on the steps 22 to close the housing 10. Each step 22 functions to position the cover 70. When the cover 70 is in contact with the steps 22, the outer surface of the cover 70 is flush with the end surface of the housing 10 that defines the opening 15. Further, the peripheral edge of the cover 70 is in close contact with the inner surface of the housing 10 that defines the opening 15.

A lock mechanism 30 for driving a lock bar 61 is attached to and supported by the inner surface of the cover 70. The lock mechanism 30 includes a motor 31, a transmission mechanism 41a, and the lock bar 61. The motor 31 is fixed to a motor bracket 71, which is formed on the inner surface of the cover 70 and which functions as a drive source support. An ECU case 110 for housing a steering lock ECU 113 is fixed to the inner surface of the cover 70. The cover 70 and the ECU case 110 cooperate to support the motor 31.

The motor 31 is connected to the transmission mechanism 41a. The transmission mechanism 41a is operably connected to the lock bar 61. The cover 70, the lock mechanism 30, and the ECU case 110 are connected integrally with each other to form a lock unit 20.

A protrusion 93, which functions as a second fastener, is formed integrally with the inner surface of the cover 70. The protrusion 93 is a cylinder having a female thread 25. The protrusion 93 has an open end surface that abuts against the bottom 13 of the receptacle 12. The bolt 6 inserted in the bolt hole 14 of the receptacle 12 is engaged with the female thread 25 to fix the cover 70 to the housing 10.

The operation of the steering lock 1 of the first embodiment will now be described.

As shown in FIGS. 4 and 5, when the lock bar 61 is located at the lock position, the distal end of the lock bar 61 engages with an engaging portion α of the rotation restrictor 109 to disable steering. To enable steering, the ECU 113 drives the motor 31 to rotate the rotary shaft 44a of the transmission mechanism 41a in a first direction. The lock bar support 54a moves away from the rotation restrictor 109 along the male thread 51a on the rotary shaft 44a. When the lock bar 61 reaches the unlock position, as indicated by the broken lines, the motor 31 stops. When the lock bar 61 is in the unlock position, the distal end of the lock bar 61 is completely separated from the engaging portion a of the rotation restrictor 109. This enables steering.

When locking steering shaft 2 to disable steering, the ECU 113 drives the motor 31 to rotate the rotary shaft 44a of the transmission mechanism 41a in a second direction. The lock bar support 54a moves toward the rotation restrictor 109 along the male thread 51a on the rotary shaft 44a. When the lock bar 61 reaches the lock position, the motor 31 stops.

Assembling of the electric steering lock 1 will now be described.

First, the lock mechanism 30 and the ECU case 110 are attached to the cover 70 to form a single lock unit 20. The lock unit 20 is arranged in the housing 10 through the opening 15 of the housing 10. Further, the distal end of the lock bar 61 is inserted into a lock bar passage 11b formed in the housing 10 (see FIG. 5).

When the cover 70 is engaged with the steps 22 and positioned, the open end surface of the protrusion 93 abuts against the bottom 13 of the receptacle 12. By positioning the cover 70 in the housing 10, the protrusion 93 is arranged at a predetermined position in the housing 10.

The bolt 6 is inserted into the bolt hole 14 of the receptacle 12 from the mounting surface 11 of the housing 10 and engaged with the female thread 25 in the protrusion 93. This fixes the cover 70 to the housing 10. The head 8 of the bolt 6 is received in the receptacle 12 and is not exposed from the receptacle 12.

As shown in FIG. 4, bolts 5 fasten the bracket 4 to the housing 10 with the sleeve 3 held between the housing 10 and the bracket 4. This fixes the steering lock 1 to the sleeve 3. The mounting surface 11 of the housing 10 is in close contact with the outer surface of the sleeve 3. Thus, the steering lock 1 is stably supported by the sleeve 3. The sleeve 3 conceals the receptacle 12. The head 8 of the bolt 6 is concealed in the receptacle 12. As a result, neither the receptacle 12 nor the head 8 of the bolt 6 can be seen from the outside of the steering lock 1. This structure prevents the bolt 6 from being removed.

The electric steering lock 1 of the first embodiment has the advantages described below.

(1) The receptacle 12 is formed to open in the mounting surface 11 of the housing 10. The bottom 13 of the receptacle 12 has the bolt hole 14. The protrusion 93, which includes the female thread 25, is formed on the inner surface of the cover 70. The bottom 13 of the receptacle 12 is fastened to the protrusion 93 by the bolt 6 to fix the cover 70 to the housing 10. Then, the housing 10 is fastened to the bracket 4 by the bolts 5 to fix the steering lock 1 to the sleeve 3. Thus, the steering lock 1 has a structure in which the bolt 6 is inserted from the mounting surface 11 to fix the cover 70 to the housing 10. In this structure, the sleeve 3 prevents the bolt 6 from being removed once the steering lock 1 is fixed to the sleeve 3. Further, neither the bolt 6 nor the protrusion 93 can be seen from the outside of the steering lock 1. Therefore, it would be burdensome for a third party, such as a vehicle thief, to remove the bolt 6 and cover 70 and dismantle the steering lock 1. Thus, this structure makes it difficult to steal the vehicle. As a result, the steering lock 1 provides a high theftproof effect.

(2) The bolt 6 and the protrusion 93 are concealed in the steering lock 1. Therefore, unlike the conventional structure as shown in FIG. 2 in which the cover 70 is fixed to the housing 10a by the bolts 128 inserted from the outer surface of the cover 70, the protective cover 129 for covering the heads of the bolt 128 is not required. This reduces the number of components. Additionally, it is not necessary to fit the protective cover 129 to the housing 10a. This improves efficiency for assembling the electric steering lock.

(3) The head 8 of the bolt 6 is concealed in the receptacle 12 and does not protrude from the mounting surface 11. Therefore, there is no need for forming a hole that receives the head 8 of the bolt 6 in the outer surface of the sleeve 3. This eliminates the need for changing the design of the sleeve 3. Accordingly, the housing 10 of the first embodiment (of a type designed to enclose the sleeve 3) may solely be sold in the market. For example, the housing 10 according to the first embodiment may be exchanged with the conventional housing 10a without modifying the conventional sleeve 3 and the steering shaft 2.

(4) The lock mechanism 30 is attached to the cover 70 to form a single lock unit 20. Therefore, the attachment of the lock mechanism 30 is performed outside the housing 10. The lock unit 20 is fixed to the housing 10 by arranging the lock unit 20 in the housing 10 and fastening the bolt 6 to the protrusion 93. Therefore, the electric steering lock 1 can be assembled more easily than the conventional structure (FIG. 2), which requires the lock mechanism and the lock bar 61 to be separately attached to the housing 10a.

(5) The bolt 6 for fastening the cover 70 to the housing 10 and the bolts 5 for fastening the steering lock 1 to the sleeve 3 are inserted from the same direction (from the right side as viewed in FIG. 4). Accordingly, the fastening of the cover 70 to the housing 10 and the fastening of the steering lock 1 to the sleeve 3 are performed from the same direction. For example, the bolt 6 is fastened to the protrusion 93 from the right side as viewed in FIG. 4 to hold the sleeve 3 between the housing 10 and the bracket 4, and the bolts 5 are fastened to the steering lock 1 from the right side as viewed in FIG. 4. Accordingly, a person who is assembling the steering lock 1 does not have to move to perform the fastening of the bolts 5 and 6. This improves efficiency for assembling the steering lock 1.

(6) The cover 70 is positioned when abutting against the steps 22 formed in the housing 10. The positioning also positions the lock unit 20 relative to the housing 10. Accordingly, the steering lock 1 is easily assembled, and assembling efficiency is improved.

The first embodiment may be modified as follows.

Instead of the electric steering lock 1, the present invention may be applied to, for example, a manual steering lock that actuates a lock bar by inserting a mechanical key into a key cylinder and turning the key.

Although the first embodiment employs the bolt 6 as the first fastener, a headless fastener such as a set screw may be used. In this case, a female-threaded hole is formed in the mounting surface 11, and the housing 10 and the protrusion 93 are fastened to each other by the set screw. The set screw is fastened to an extent in which it does not protrude from the mounting surface 11. This eliminates the need for the receptacle 12, and the need for forming a hole in the sleeve 3 to receive the head of the screw.

Figure 2:
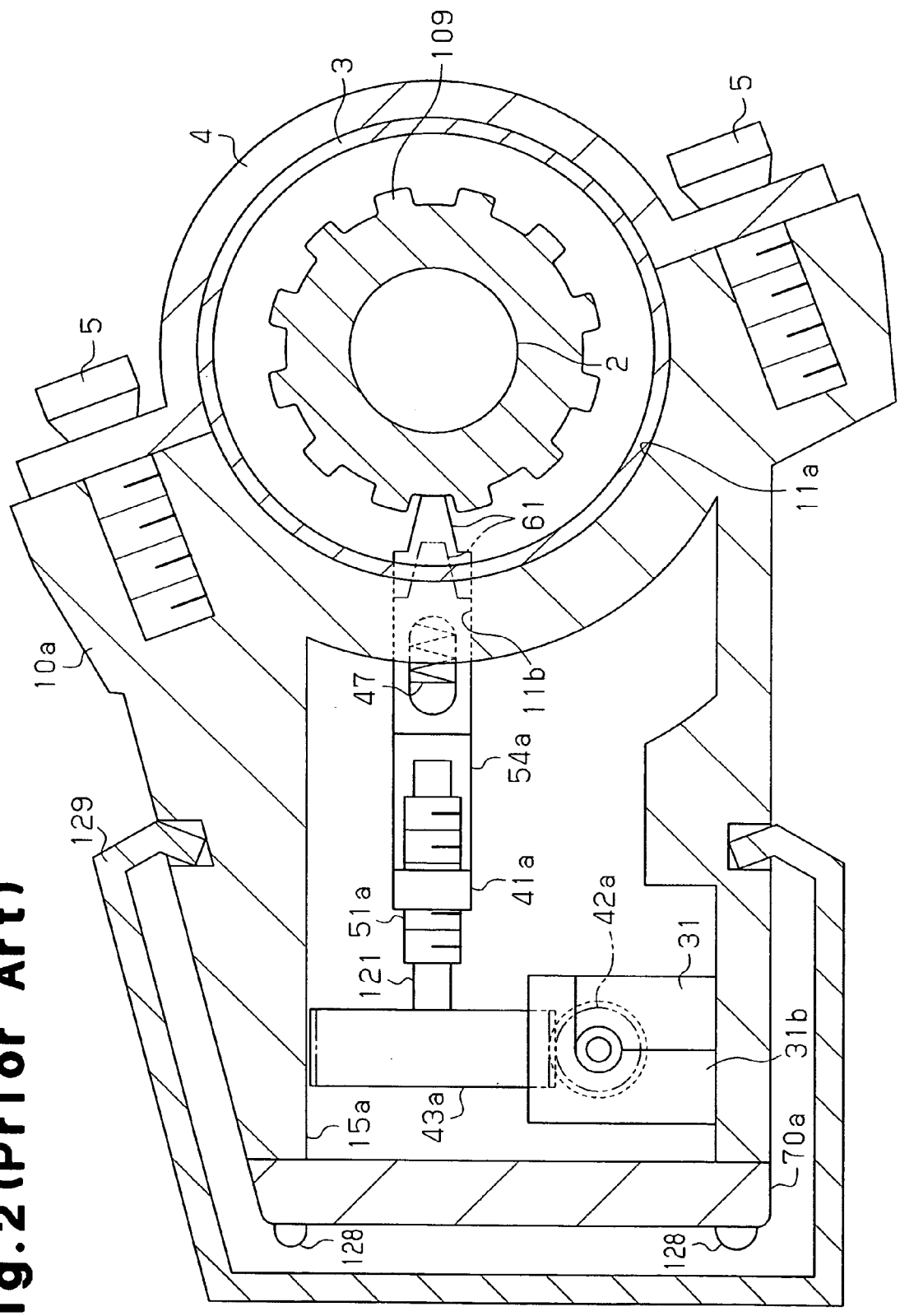
FIG. 2 is a cross-sectional view of the steering lock taken along line 2-2 in FIG. 1.
Figure 3:
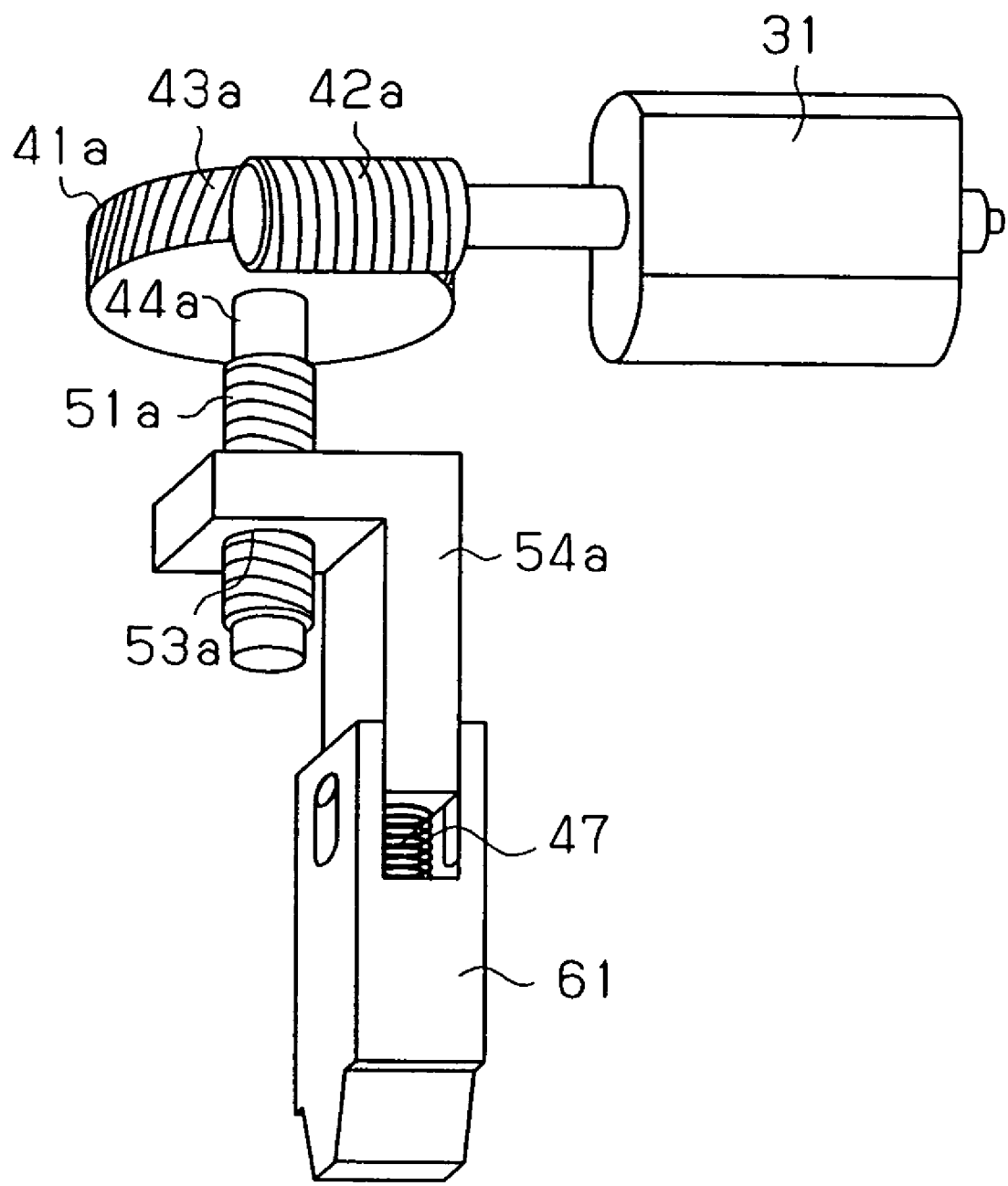
FIG. 3 is a perspective view showing a lock mechanism of the lock bar in the steering lock shown in FIG. 1.

A shield member, such as a cap similar to the protective cover 129 shown in FIG. 2, may be attached to the housing 10 or the cover 70 so as to conceal the boundary between the periphery of the cover 70 and the opening 15 of the housing 10. In this case, the boundary cannot be seen from the outside of the steering lock 1. This makes it difficult to dismantle the steering lock 1 and makes it more difficult to steal the vehicle.

In the first embodiment, the cover 70 and the steps 22 are formed so that the outer surface of the cover 70 is flush with the end surface of the housing 10 defining the opening 15. However, the outer surface of the cover 70 may protrude from the end surface of the opening 15 of the housing 10. Alternatively, the outer surface of the cover 70 may be located inward from the end surface of the opening 15 of the housing 10.

An electric steering lock 1 for use in vehicles according to a second embodiment of the present invention will now be described with reference to FIGS. 6 to 13.

The steering lock 1 inhibits steering operation by engaging a lock bar 61 with a steering shaft 2 with the use of drive force of a motor 31.

The steering lock 1 includes a magnesium die-cast housing 10 and a lock unit 20 incorporated in the housing 10. A sleeve 3, which receives and supports the steering shaft 2, is held between the housing 10 and a bracket 4, which are fastened to each other by bolts 5.

The housing 10 has an arcuate mounting surface 11 extending along the outer surface of the sleeve 3. The housing 10 has a receptacle 12, which opens in the mounting surface 11. A bolt hole 14 is formed in the bottom 13 of the receptacle 12 to receive a bolt 6, which functions as a first fastener. The bolt 6 includes a male-thread shaft 7, which functions as a fastening portion, and a head 8, which is arranged on one end of the shaft 7. The head 8 has a diameter that is greater than the diameter of the bolt hole 14. The head 8 of the bolt 6 is engaged with the bottom 13 of the receptacle 12.

An accommodation chamber 16 is defined in the housing 10. The accommodation chamber 16 has an opening 15 located opposite to the mounting surface 11. A lock unit 20 is arranged in the accommodation chamber 16 through the opening 15 and attached to the housing 10.

As shown in FIG. 7, the lock unit 20 includes a lock mechanism 30, a magnesium die-cast cover 70, and a resin ECU case 110. The lock mechanism 30 is supported by cooperation between the cover 70 and the ECU case 110. The lock mechanism 30 includes a motor 31, a transmission mechanism 41, and a lock bar 61 (see FIG. 13). The motor 31 functions as a drive source for moving the lock bar 61 relative to the steering shaft 2. The transmission mechanism 41 transmits drive force of the motor 31 to the lock bar 61. The cover 70 closes the opening 15 of the housing 10.

Figure 8A:
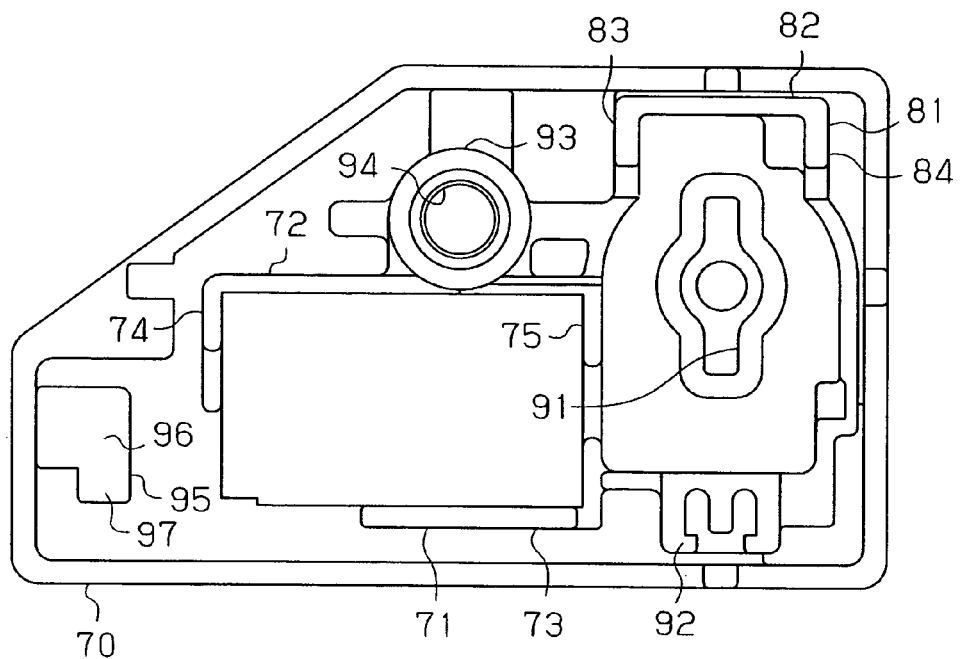
FIG. 8A is a plan view and FIG. 8B is a perspective view showing a cover of the steering lock shown in FIG. 6.
Figure 8B:
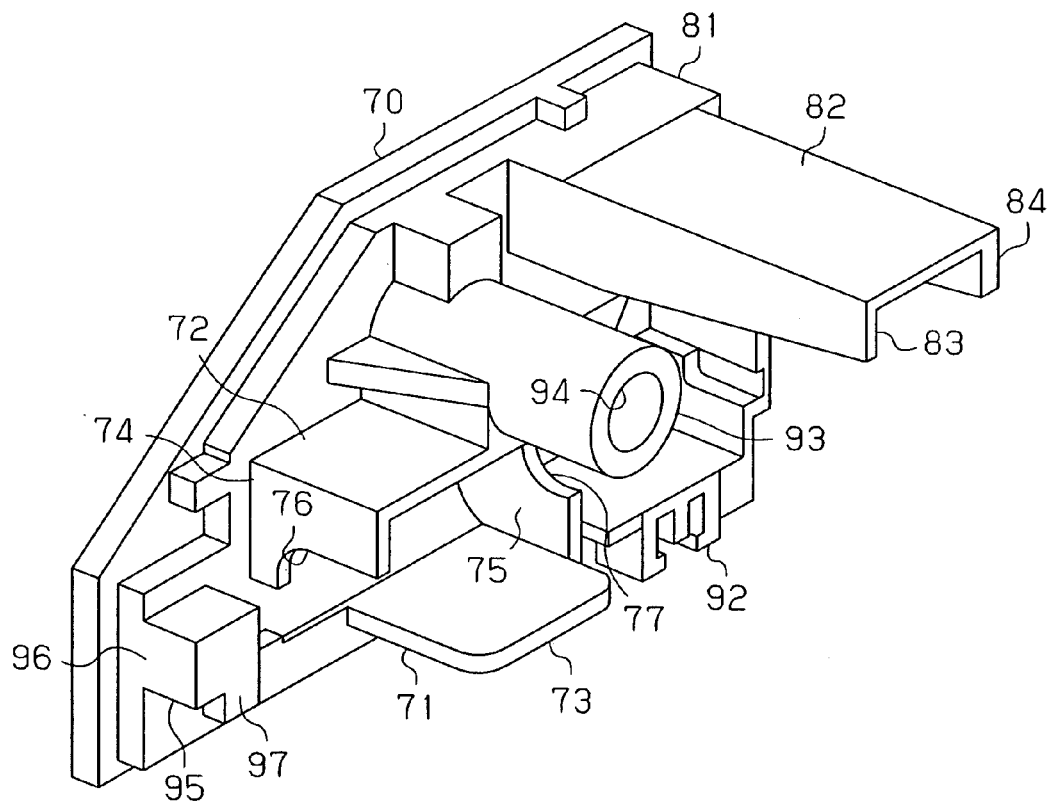

As shown in FIG. 8B, the cover 70 has an inner surface facing the accommodation chamber 16 and an outer surface opposite to the inner surface. A first drive source support 71 is formed integrally on the inner surface of the cover 70 such that the first drive source support 71 extends orthogonally to the inner surface to hold the motor 31. The first drive source support 71 may be a rectangular frame having an upper wall 72 engaging with an upper portion of the motor 31, a lower wall 73 engaging with a lower portion of the motor 31, a first side wall 74 engaging with a basal end of the motor 31, and a second side wall 75 engaging with a distal end of the motor 31. The first side wall 74 has an arcuate surface 76 for supporting a bearing 32 of the motor 31 (see FIG. 7). The second side wall 75 has a similar arcuate surface 77. Part of the motor 31 may be engaged with the inner surface of the cover 70. The motor 31 is mainly held by the first drive source support 71, which is integral with the cover 70. The motor 31 is not directly fixed to the housing 10.

A U-shaped support frame 81 is formed integrally with the cover 70 near the first drive source support 71 so as to extend orthogonally relative to the inner surface of the cover 70. The support frame 81 has an upper wall 82 engaging with the top of the transmission mechanism 41, a first side wall 83 engaging with one side of the transmission mechanism 41, and a second side wall 84 engaging with the other side of the transmission mechanism 41 and the lock bar 61.

A bushing support 91 is formed on the inner surface of the cover 70 near the support frame 81. The bushing support 91 supports a first bushing 35 included in the transmission mechanism 41 (see FIG. 11). An M-shaped leaf spring support 92 is formed near the bushing support 91. The leaf spring support 92 supports a leaf spring 48 included in the transmission mechanism 41 (see FIG. 11). The support frame 81, the bushing support 91, and the leaf spring support 92 form a first transmission mechanism support structure. The transmission mechanism 41 is mainly held by the first transmission mechanism support structure and is not directly fixed to the housing 10.

A protrusion 93, which functions as a second fastener, is formed integrally with the inner surface of the cover 70. The protrusion 93 is a cylinder having a female thread 94. The protrusion 93 has an open end surface that abuts against the bottom 13 of the receptacle 12 of the housing 10. The cover 70 (lock unit 20) is fixed to the housing 10 by inserting the bolt 6 in the bolt hole 14 of the receptacle 12 and engaging the bolt 6 with the female thread 94.

Figure 11:
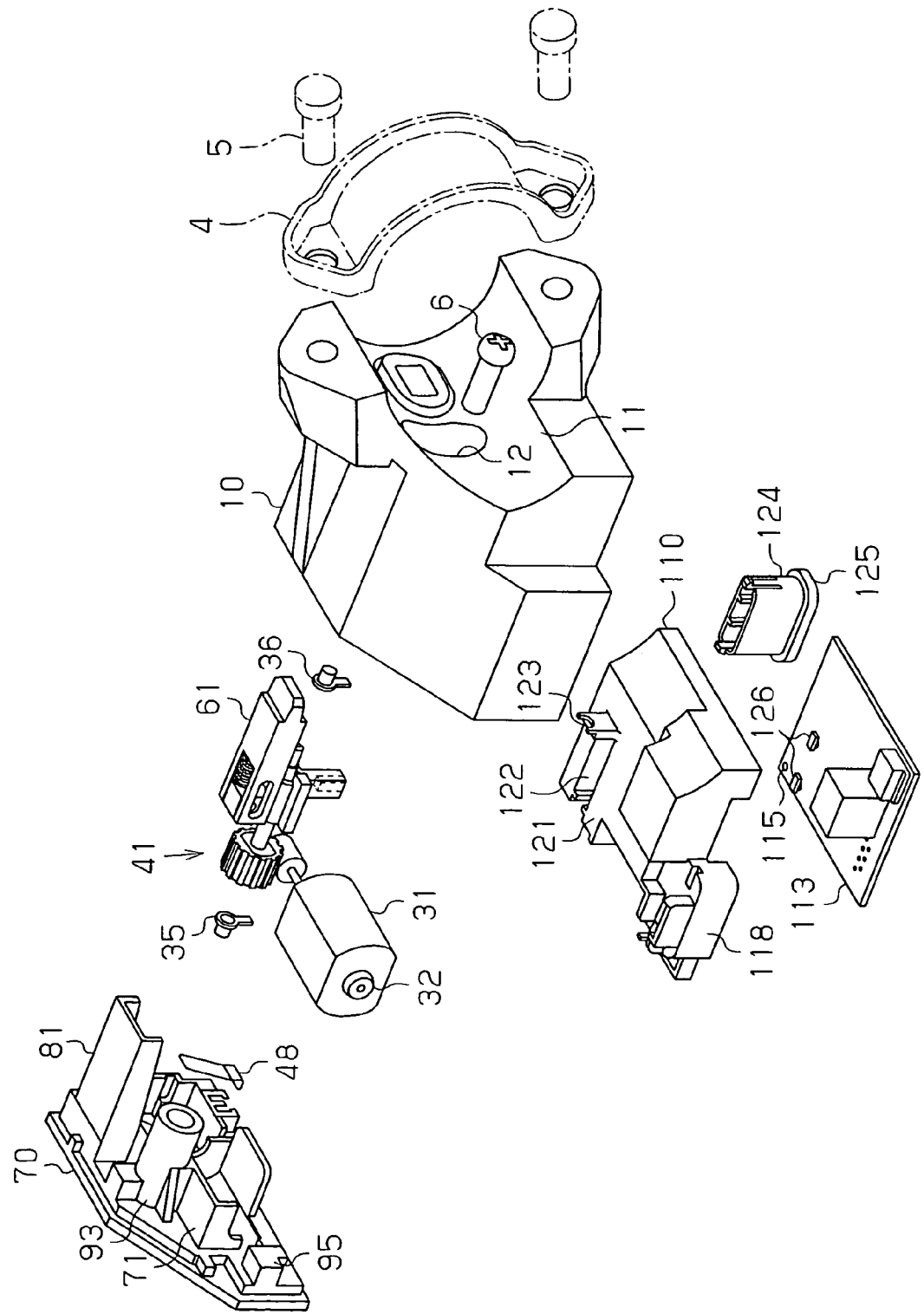
FIG. 11 is an exploded perspective view showing the steering lock of FIG. 6.

An L-shaped pawl 95 is formed on a lower portion of the cover 70, as viewed in FIGS. 10A, 10B, and 11. The pawl 95 has a basal end 96 and a distal end 97 extending downwards from the basal end 96. The distal end 97 of the pawl 95 engages with a notch 111 formed in the ECU case 110. The engagement between the pawl 95 and the notch 111 positions the cover 70 with respect to the ECU case 110 and prevents the ECU case 110 from moving relative to the cover 70. For example, the ECU case 110 is prevented from moving in the lateral direction along the cover 70.

An accommodation compartment 112 is formed in the rear surface of the ECU case 110. A steering lock ECU 113, which includes a circuit board having a control circuit for controlling the motor 31, is arranged in the board accommodation compartment 112. A plurality of cylindrical projections 114 are provided in the accommodation compartment 112. The cylindrical projections 114 are thermally caulked into and received by round holes 115 formed in the steering lock ECU 113. This fixes the steering lock ECU 113 to the ECU case 110. Accordingly, the steering lock ECU 113 is supported only by the ECU case 110. The ECU case 110 entirely covers one surface of the steering lock ECU 113 (the surface on which the control circuit and other electronic components are arranged). Thus, foreign material such as metallic powder is prevented from collecting in the steering lock ECU 113.

Figure 12:
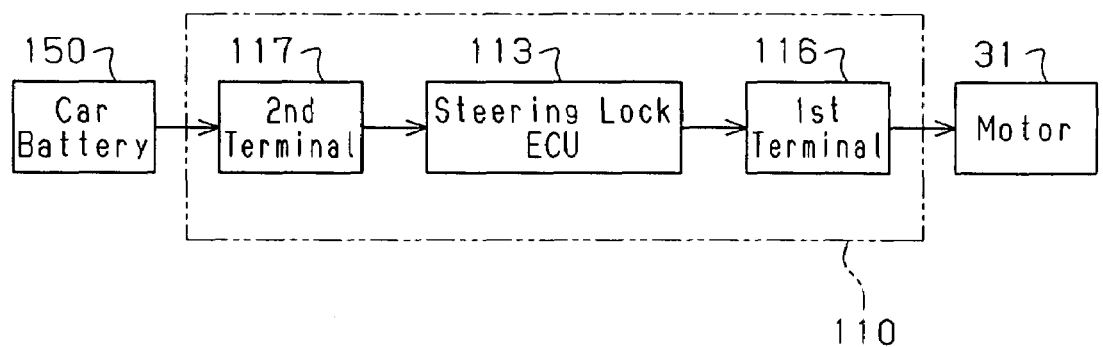
FIG. 12 is a block diagram showing a motor controller.

As shown in FIGS. 10A and 10B, the ECU case 110 has a first terminal 116 and a second terminal 117, which are insert-molded. The first terminal 116 is an internal terminal directly connected to the input terminal of the motor 31. The second terminal 117 is an external terminal for receiving power from a car battery 150 (see FIG. 12) located outside the housing 10. As shown in FIG. 12, the steering lock ECU 113 is connected between the first terminal 116 and the second terminal 117. The steering lock ECU 113 includes a drive circuit, which drives the motor 31 with the power supplied to the second terminal 117.

The distal end of first terminal 116 extends from the inner surface of the ECU case 110. The distal end of the first terminal 116 functions as a brush, which elastically contacts the input terminal of the motor 31. When the ECU case 110 is connected to the cover 70 to which the motor 31 is attached, the distal end of the first terminal 116 is electrically connected to the input terminal of the motor 31. The basal end of the first terminal 116 is arranged in the accommodation compartment 112 and electrically connected to the steering lock ECU 113.

The distal end of the second terminal 117 is arranged in a terminal socket 118 which is defined in the rear surface of the ECU case 110. The basal end of the second terminal 117 is arranged in the accommodation compartment 112 and electrically connected to the steering lock ECU 113.

The distal end of the second terminal 117 and the terminal socket 118 form a first connector 119. The first connector 119 is housed in the housing 10 (see FIG. 9).

The ECU case 110 includes a second drive source support, which cooperates with the first drive source support 71 of the cover 70 to fasten the motor 31. The second drive source support is formed around the first terminal 116 and includes a support surface 120 supporting the lower portion of the motor 31. The first drive source support and the second drive source support form a drive source holder.

The ECU case 110 includes a second transmission mechanism support structure 121, which supports the transmission mechanism 41 with the first transmission mechanism support structure of the cover 70. The second transmission mechanism support structure 121 includes a groove 122, which engages part of the transmission mechanism 41, and a second bushing support 123, which supports a second bushing 36 (see FIG. 11) attached to the transmission mechanism 41. The second transmission mechanism support structure 121 cooperates with the first transmission mechanism support structure of the cover 70 to hold the transmission mechanism 41. The first transmission mechanism support structure and the second transmission mechanism support structure form a transmission mechanism holder.

Figure 9:
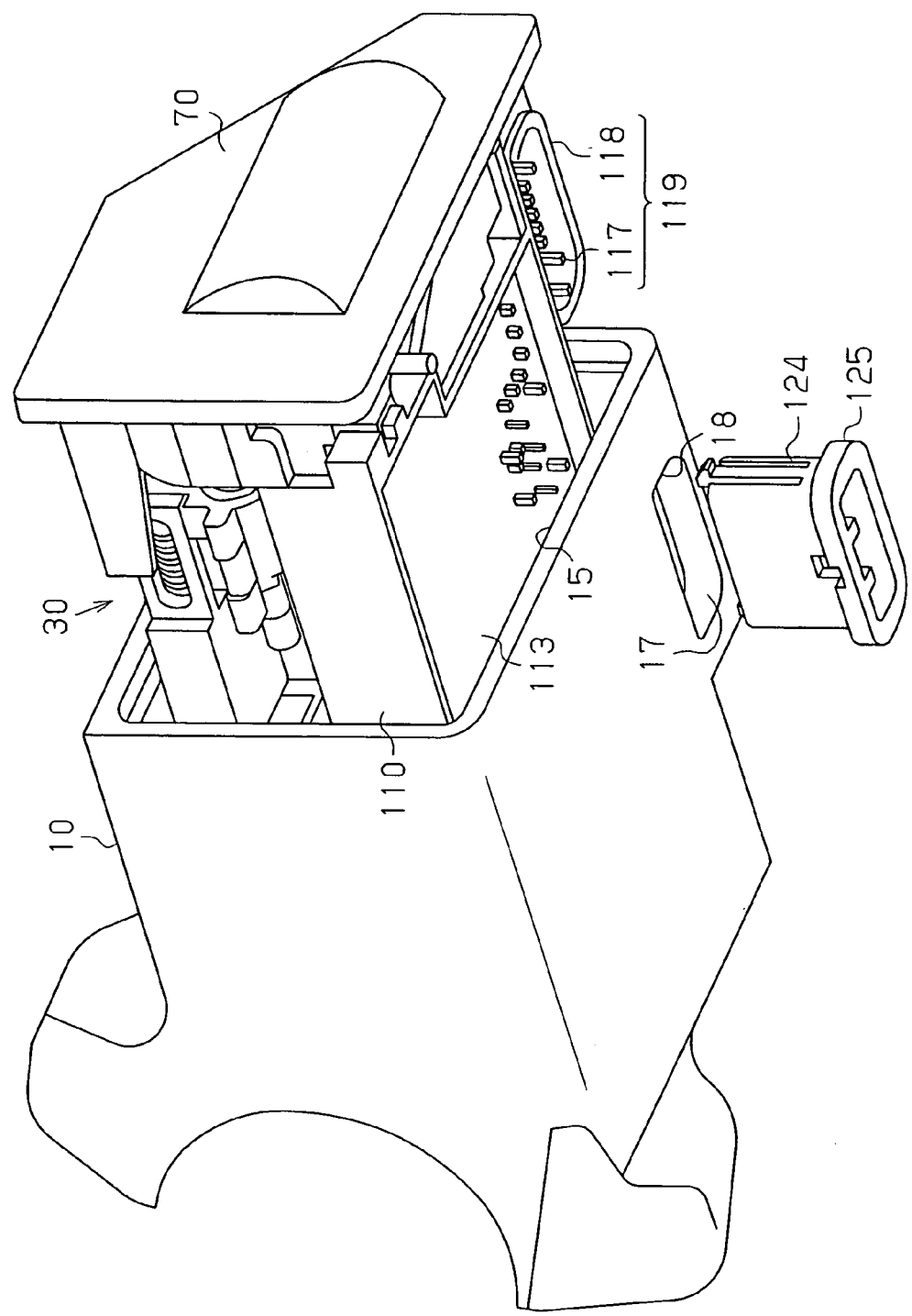
FIG. 9 is an exploded perspective view showing the lock unit, a second connector, and the housing.

As shown in FIG. 9, the housing 10 has an exterior wall 18 having a through hole 17. The through hole 17 is not formed continuously from the opening 15. The through hole 17 receives a second connector 124, a tubular coupler plug. The second connector 124 serves as a connector attachment. The second connector 124 has a basal end including a flange 125 and a distal end housed in the terminal socket 118 of the ECU case 110 and engaged with the first connector 119. When the second connector 124 is coupled to the first connector 119, the flange 125 of the second connector 124 protrudes from the outer surface of the housing 10. A cable is connected to the second connector 124 for supplying power from the car battery 150 to the motor 31.

The engagement between the second connector 124 inserted in the through hole 17 and the exterior wall 18 of the housing 10 prevents the lock unit 20 (steering lock ECU 113) from falling but of the housing 10 and retains it in the housing 10.

The first connector 119 and the second connector 124 function as external connectors, each of which functions as a power terminal for supplying the power of the car battery 150 to the motor 31 and the steering lock ECU 113 and as an interface between the steering lock ECU 113 and a vehicle ECU.

Figure 13:
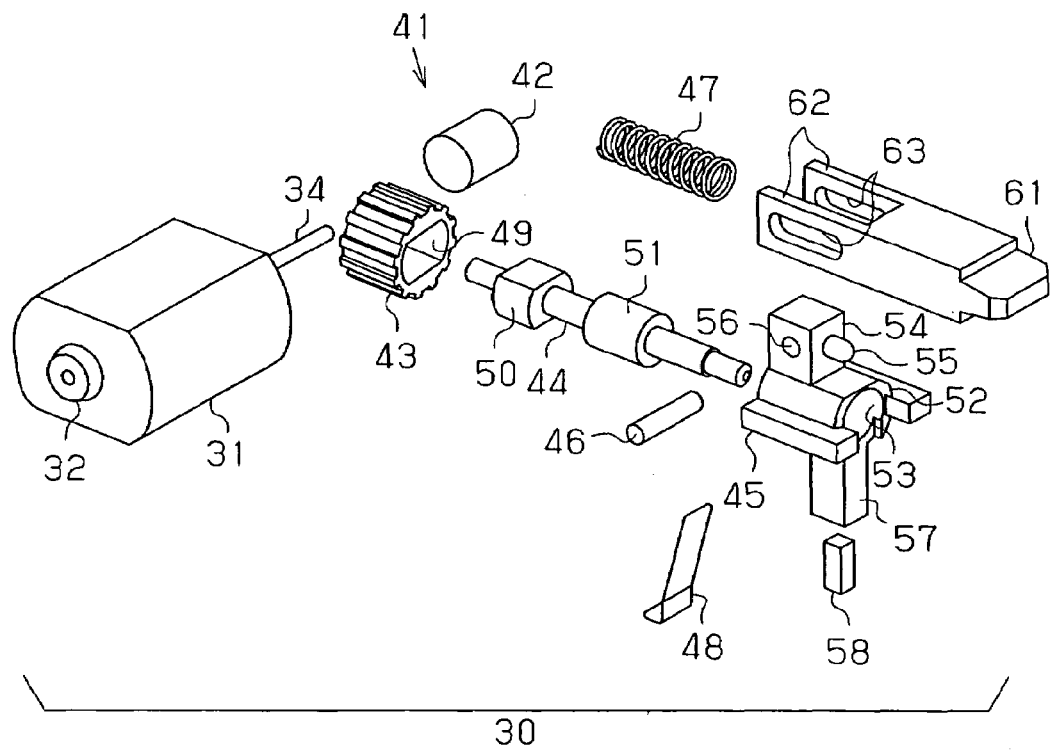
FIG. 13 is an exploded perspective view showing the lock mechanism.

As shown in FIG. 13, the transmission mechanism 41 is arranged between the motor 31 and the lock bar 61. As shown in FIG. 11, the transmission mechanism 41 includes a worm gear 42, a helical gear 43, a rotary shaft 44, a lock bar carrier 45, a pin 46, a spring 47, and a leaf spring 48. The worm gear 42 is fixed to an output shaft 34 of the motor 31. The worm gear 42 is meshed with the helical gear 43. The helical gear 43 has an insertion hole 49 to receive and support an expanded portion 50 of the rotary shaft 44. The helical gear 43 and the rotary shaft 44 are rotated by the motor 31.

The rotary shaft 44 has a male-thread portion 51. The lock bar carrier 45 includes a cylindrical body 52 having a female-thread portion 53. The male-thread portion 51 of the rotary shaft 44 is engaged with the female-thread portion 53 of the lock bar carrier 45. An example of the female-thread portion 53 is a trapezoidal double-threaded screw. The engagement between the female-thread portion 53 and the male-thread portion 51 converts the rotation of the rotary shaft 44 to linear motion of the lock bar carrier 45. The lock bar carrier 45 is movable within the range the female-thread portion 53 is engaged with the male-thread portion 51.

A support column 54 for supporting the lock bar 61 is formed on the cylindrical body 52 of the lock bar carrier 45. The support column 54 includes a spring seat 55. The spring 47 is arranged on the spring seat 55. The support column 54 includes a pin hole 56 which extends orthogonally relative to the spring seat 55. The lock bar carrier 45 includes two elongated stopper projections, which linearly extend on the outer surface of the cylindrical body 52 and along the axis of the cylindrical body 52 (i.e., moving direction of the lock bar 61).

The lock bar 61 has two side plates 62. The support column 54 is arranged between the two side plates 62. The spring 47 is elastically held between the lock bar 61 and the spring seat 55 of the support column 54. The spring 47 urges the lock bar 61 toward the steering shaft 2. An elongated hole 63 extends through each of the side plates 62 of the lock bar 61. The pin 46 is received in and supported by the elongated holes 63 and the pin hole 56 of the support column 54. When compressive force of the spring 47 is applied to the lock bar 61, the pin 46 moves relative to the elongated holes 63. This absorbs the compressive force. The distance of the elastic movement of the lock bar 61 is restricted by the length of the elongated holes 63.

The lock bar 61 moves linearly integrally with the lock bar carrier 45 when the motor 31 is activated. Abutment or engagement between the stopper projections of the lock bar carrier 45 and the support frame 81 of the cover 70 prevents the lock bar carrier 45 from being rotated by the rotary shaft 44. The support frame 81 of the cover 70 enables only linear movement of the lock bar carrier 45 and restricts rotation of the lock bar 61. The lock bar carrier 45 functions as a carrier. The stopper projections of the lock bar carrier 45 function as part of a structure for restricting rotation of the lock bar carrier 45. The support frame 81 of the cover also functions as part of a structure for restricting rotation of the lock bar carrier 45 and as a guide piece for guiding movement of the lock bar carrier 45.

A magnet holder 57 is formed under the cylindrical body 52. The magnet holder 57 holds a magnet 58. The magnet holder 57 is received in the groove 122 of the ECU case 110. The magnet holder 57 and the magnet 58 move along the groove 122 when the motor 31 is activated.

In the ECU case 110, two Hall ICs 126 are located underneath the groove 122 to detect the position of the magnet 58. The Hall ICs 126 may be connected to the steering lock ECU 113. The Hall ICs 126 may be arranged, for example, such that one of the Hall ICs 126 detects the magnet 58 when the lock bar 61 is located at the lock position, and the other Hall IC 126 detects the magnet 58 when the lock bar 61 is located at the unlock position. The ECU 113 determines, based on detection signals from the Hall ICs 126, whether the lock bar 61 is located at the lock position or at the unlock position. Steering is disabled when the lock bar 61 is located at the lock position. Steering is enabled when the lock bar 61 is located at the unlock position.

The lock bar carrier 45 is a single member integrally formed from the cylindrical body 52, the support column 54, the structure for converting rotation produced by the motor 31 to linear motion of the lock bar 61 (female-thread portion 53), and the magnet holder 57 holding the magnet 58 for detecting the position of the lock bar 61.

The first bushing 35 and the second bushing 36 are arranged on opposite ends of the rotary shaft 44. The leaf spring 48 urges the lock bar carrier 45 towards the mounting surface 11 of the housing 10. Due to this urging, even if the female-thread portion 53 of the lock bar carrier 45 and the male-thread portion 51 of the rotary shaft 44 are disengaged from each other, the engagement between the female-thread portion 53 and the male-thread portion 51 is immediately restored.

Operation of the steering lock 1 of the second embodiment will now be described.

When the steering shaft 2 is engaged with the lock bar 61 (as indicated by the state shown by the solid lines in FIG. 6), the steering lock 1 is in a lock state. If the engine is started when the steering lock 1 is locked, the steering lock ECU 113 produces rotation in a first direction with the motor 31. Thus, the motor 31 rotates the worm gear 42, the helical gear 43, and the rotary shaft 44. The engagement between the female-thread portion 53 of the lock bar carrier 45 and the male-thread portion 51 of the rotary shaft 44 moves the lock bar carrier 45 and the lock bar 61 away from the steering shaft 2. When the Hall ICs 126 detect an unlock state based on the position of the magnet 58, the steering lock ECU 113 stops the motor 31. As a result, the steering lock 1 shifts to the unlock state in which steering is enabled (as indicated by the state shown by the broken lines in FIG. 6).

When the engine is stopped with the steering lock 1 in the unlock state and a vehicle occupant opens and closes the vehicle door to leave the vehicle, the steering lock ECU 113 produces rotation with the motor 31 in a second direction. The motor 31 rotates the worm gear 42, the helical gear 43, and the rotary shaft 44. The engagement between the female-thread portion 53 of the lock bar carrier 45 and the male-thread portion 51 of the rotary shaft 44 moves the lock bar carrier 45 and the lock bar 61 towards the steering shaft 2. When the Hall ICs 126 detect the lock state based on the position of the magnet 58, the steering lock ECU 113 stops the motor 31. As a result, the steering lock 1 shifts to the lock state in which steering is disabled (as indicated by the state shown by the broken lines in FIG. 6).

The procedures for assembling the steering lock 1 of the second embodiment will now be described.

The lock mechanism 30 (the motor 31, the transmission mechanism 41, and the lock bar 61) is attached to the cover 70 to assemble a first sub unit. The steering lock ECU 113 is attached to the ECU case 110 to assemble a second sub unit. The first sub unit is then attached to the second sub unit to assemble the lock unit 20. The lock unit 20 is attached to the housing 10. The second connector 124 is then fitted in the first connector 119.

The steering lock 1 of the second embodiment has the advantages described below.

(1) The first drive source support 71 and first transmission mechanism support structure formed on the cover 70 support the lock mechanism 30 (the motor 31, the transmission mechanism 41, and the lock bar 61). This forms a unit including the cover 70 and the lock mechanism 30 before the cover 70 is attached to the housing 10. The lock mechanism 30 is accommodated in the accommodation chamber 16 of the housing 10 by closing the opening 15 of the housing 10 with the cover 70. Thus, assembly operations do not have to be performed in the accommodation chamber 16 of the housing 10. This improves assembling efficiency of the steering lock 1.

(2) The cover 70 and the ECU case 110 cooperate with each other to stably hold the lock mechanism 30 (the motor 31, the transmission mechanism 41, and the lock bar 61). Therefore, the lock unit 20 including the cover 70, the ECU case 110, and the lock mechanism 30 is formed before the cover 70 is attached to the housing 10. The arrangement of the lock mechanism 30 at the predetermined position in the accommodation chamber 16 of the housing 10 is ensured by attaching the lock unit 20 to the housing 10. This improves assembling efficiency of the steering lock 1.

(3) The steering lock ECU 113 is accommodated in the accommodation compartment 112 of the ECU case 110 and supported by the ECU case 110. The ECU 113 is not supported by the cover 70. The lock mechanism 30 is also supported by the ECU case 110. Therefore, structures for holding the lock mechanism 30 are not concentrated on the cover 70. Further, the assembling of the first sub unit with the cover 70 and the lock mechanism 30 is facilitated. This improves assembling efficiency of the steering lock 1.

(4) The second connector 124 inserted in the through hole 17 of the housing 10 is connected to the first connector 119 to form an external connector. Thus, the external connector is divided into the first connector 119 and the second connector 124. Therefore, the housing 10 and the ECU case 110 may be designed such that the first connector 119 does not interfere with the attachment of the lock unit 20 to the housing 10. Such designing is easier than when forming a single external connector in the housing 10 or the ECU case 110.

The through hole 17 is not connected to the opening 15 of the housing 10. This enables the housing 10 to have higher strength in comparison to the housing of the prior art which includes a groove connected to the opening 15 (not shown). For example, even if stress is concentrated in the opening 15 of the housing 10, the housing 10 is prevented from being broken around the through hole 17. Thus, the housing 10 is relatively compact and strong.

(5) The flange 125 of the second connector 124 is exposed from the exterior wall 18 of the housing 10. This facilitates connection of a cable to the second connector 124.

(6) The engagement of the second connector 124 with the exterior wall 18 of the housing 10 and part of the lock unit 20 prevents the lock unit 20 from falling out of the housing 10. Additionally, it is difficult for a third party to notice that the second connector 124 forms part of the structure that attaches the housing 10 and the lock unit 20. Therefore, it is difficult to dismantle the steering lock 1 when stealing the vehicle. Thus, the steering lock 1 has a high theftproof effect.

(7) The first terminal 116 of the ECU case 110 is directly connected to the input terminal of the motor 31. This eliminates the need for an additional component electrically connecting the first terminal 116 and the input terminal and facilitates the attachment of the motor 31. Thus, assembling efficiency of the steering lock 1 is improved.

(8) The first terminal 116 of the ECU case 110 is directly connected to the steering lock ECU 113. This eliminates the need for an additional component electrically connecting the first terminal 116 and the steering lock ECU 113 and facilitates the attachment of the ECU case 110. Thus, assembling efficiency of the steering lock 1 is improved.

(9) The second terminal 117 of the ECU case 110 is directly connected to the steering lock ECU 113. This eliminates the need for an additional component electrically connecting the second terminal 117 and the steering lock ECU 113 and facilitates the attachment of the ECU case 110. Thus, assembling efficiency of the steering lock 1 is improved.

(10) The lock bar carrier 45 is a single member which integrally formed from the cylindrical body 52 and the support column 54. Hence, there is no need for attaching the cylindrical body 52 and the support column 54 to each other. This improves assembling efficiency of the steering lock 1.

(11) The lock bar carrier 45 is a single member formed from a structure for converting rotation of the motor 31 to linear motion of the lock bar 61 (female-thread portion 53). Therefore, there is no need for assembling such a structure. Thus, assembling efficiency of the steering lock 1 is improved.

(12) When the motor 31 is activated, the lock bar carrier 45 supporting the lock bar 61 is moved in a state guided by the support frame 81 of the cover 70. This ensures that the lock bar 61 is engaged with the steering shaft 2.

(13) The lock bar carrier 45 is a single member integrally formed from the magnet holder 57, which holds the magnet 58 for determining the position of the lock bar 61. This eliminates the need for attaching the magnet holder 57 to the lock bar carrier 45. Thus, assembling efficiency of the steering lock 1 is improved.

(14) The cover 70 is fixed to the housing 10 by inserting the bolt 6 into the accommodation chamber 16 from the mounting surface 11 of the housing 10 and fastening the bolt 6 to the protrusion 93 arranged on the inner surface of the cover 70. The housing 10 is then fixed to the sleeve 3. Since the mounting surface 11 is concealed by the sleeve 3, the bolt 6 and the protrusion 93 cannot be seen from the outer side of the steering lock 1. Further, the sleeve 3 interferes with the removal of the bolt 6. This makes it difficult for a third party to remove the cover 70 and steal the vehicle. Thus, the steering lock 1 provides a high theftproof effect.

The second embodiment may be modified as described below.

The steering lock ECU 113 need not necessarily be fixed directly to the housing 10 and may be supported by a support which is provided integrally with the cover 70.

The position of the through hole 17 in the exterior wall 18 of the housing 10 may be changed in accordance with the position of the first connector 119. The through hole 17 is preferably formed at a position spaced from the edge of the opening 15 of the housing 10, which deforms relatively easily.

The external connector is not limited to the first connector 119 and the second connector 124. Three or more connectors may be used as the external connector.

The quantity of the first terminal 116 may be changed in accordance with the number of the input terminals of the motor 31.

The quantity of the second terminal 117 may be changed in accordance with the number of signals required for communication between the steering lock ECU 113 and the on-vehicle ECU.

The drive source is not limited to the motor 31 and may be any type of actuator.

The distal end of the lock bar 61 may include a recess for receiving a projection of the steering shaft 2.

It should be apparent to those skilled in the art that the present invention may be embodied in many other specific forms without departing from the spirit or scope of the invention. Therefore, the present examples and embodiments are to be considered as illustrative and not restrictive, and the invention is not to be limited to the details given herein, but may be modified within the scope and equivalence of the appended claims.

What is claimed is:

1. A steering lock for attachment to a sleeve covering a steering shaft in a vehicle for selectively disabling steering, the steering lock comprising:
   a housing including a mounting surface attachable to the sleeve and an opening formed opposite to the mounting surface;
   a lock mechanism housed in the housing, the lock mechanism including a lock member for engaging with and disengaging from the steering shaft;
   a cover, fixed to the housing, for closing the opening;
   a first fastener inserted into the housing from the mounting surface to fix the cover to the housing, wherein the first fastener is concealed by the sleeve and cannot be seen from the outside of the steering lock when the mounting surface is attached to the sleeve; and
   a second fastener formed on the cover, housed in the housing, and engaged with the first fastener, the cover being fixed to the housing by the engagement between the first fastener and the second fastener,
   wherein the first fastener includes a fastening portion for engaging the second fastener, and a head manipulated for engaging the first fastener with the second fastener, and wherein the housing includes a receptacle that opens in the mounting surface to receive the head of the first fastener, the receptacle having a bottom with a hole for receiving the fastening portion of the first fastener, and the receptacle completely accommodating the head so that the head does not protrude from the mounting surface when the fastening portion is inserted through the hole and fastened to the second fastener.

2. The steering lock according to claim 1, wherein the lock mechanism and the cover are integrated to form a lock unit housed in the housing, the lock mechanism being indirectly supported by the housing via the cover.

3. The steering lock according to claim 1, wherein the cover includes a peripheral surface that contacts an inner surface of the housing defining the opening and wherein the peripheral surface of the cover is not exposed from the housing and cannot be seen from the outside of the steering lock when the cover is fixed to the housing.

4. The steering lock according to claim 1, wherein the housing includes a step, formed along the opening, for engaging the cover.

5. The steering lock according to claim 1, further comprising:
   a shield member for concealing a boundary between a peripheral edge of the cover and the opening of the housing.

6. The steering lock according to claim 1, wherein the cover and the lock mechanism are integrally detached from the housing when the first fastener is disengaged from the second fastener.

7. The steering lock according to claim 1, further comprising:
   a holder for holding internal components including the lock mechanism, with at least part of the holder being integrally formed with the cover.

8. A steering lock for selectively disabling steering by engaging a lock bar with a vehicle steering shaft, the steering lock comprising:
   a housing defining an accommodation chamber having an opening, the housing being configured to be attached to a sleeve that covers a vehicle steering shaft, wherein the housing includes a mounting surface formed opposite to the opening;
   a cover for closing the opening;
   a first fastener inserted into the accommodation chamber from the mounting surface;
   wherein the first fastener is concealed by the sleeve and cannot be seen from the outside of the steering lock when the mounting surface is attached to the sleeve;
   a second fastener formed on an inner surface of the cover and fastened to the first fastener, the cover being fixed to the housing by fastening the first fastener to the second fastener;
   internal components inserted in the accommodation chamber through the opening; and
   a holder for holding the internal components, with a least part of the holder being integrally formed with the cover.

9. The steering lock according to claim 8, wherein the internal components include a drive source for engaging and disengaging the lock bar and the steering shaft, and the holder includes a drive source holder for supporting the drive source, with part of the drive source holder being integrally formed with the cover.

10. The steering lock according to claim 9, wherein the internal components include a transmission mechanism for transmitting drive force of the drive source to the lock bar, and the holder includes a transmission mechanism holder for supporting the transmission mechanism, with part of the transmission mechanism holder being integrally formed with the cover.

11. The steering lock according to claim 8, wherein the holder includes a first support structure formed integrally with the cover, and a second support structure cooperating with the first support structure to support the internal components, the steering lock further comprising:
   a case attached to the cover, the second support structure being integrally formed with the case.

12. The steering lock according to claim 11, wherein the case covers a circuit board including a control circuit for controlling the drive source, with the circuit board being supported only by the case.

13. The steering lock according to claim 12, further comprising:
   a first connector formed on the case and electrically connected to the circuit board; and
   a connector attachment, engaged with the first connector and the housing, for retaining the cover and the case in positional relationship with the housing.

14. The steering lock according to claim 8, wherein the holder is not formed on the housing.

15. The steering lock according to claim 8, wherein the housing houses the internal components attached to the cover, and the internal components are not directly fixed to the housing.

16. The steering lock according to claim 8, wherein:
   said at least part of the holder and the internal components held by said at least part of the holder are integrally inserted in the housing when the cover is attached to the housing; and
   said at least part of the holder, the internal components held by said at least part of the holder, and the cover are integrally detached from the housing when the cover is removed from the housing.

17. A steering lock for attachment to a sleeve covering a steering shaft in a vehicle for selectively disabling steering, the steering lock comprising:
   a housing including a mounting surface attachable to the sleeve and an opening formed opposite to the mounting surface;
   a lock mechanism housed in the housing, the lock mechanism including a lock member for engaging with and disengaging from the steering shaft;
   a cover, fixed to the housing, for closing the opening;
   a first fastener inserted into the housing from the mounting surface to fix the cover to the housing, wherein the first fastener is concealed by the sleeve and cannot be seen from the outside of the steering lock when the mounting surface is attached to the sleeve; and
   a second fastener formed on the cover, housed in the housing, and engaged with the first fastener, the cover being fixed to the housing by the engagement between the first fastener and the second fastener,
   wherein the cover and the lock mechanism are integrally detached from the housing when the first fastener is disengaged from the second fastener.

* * * * *